Figure 1:
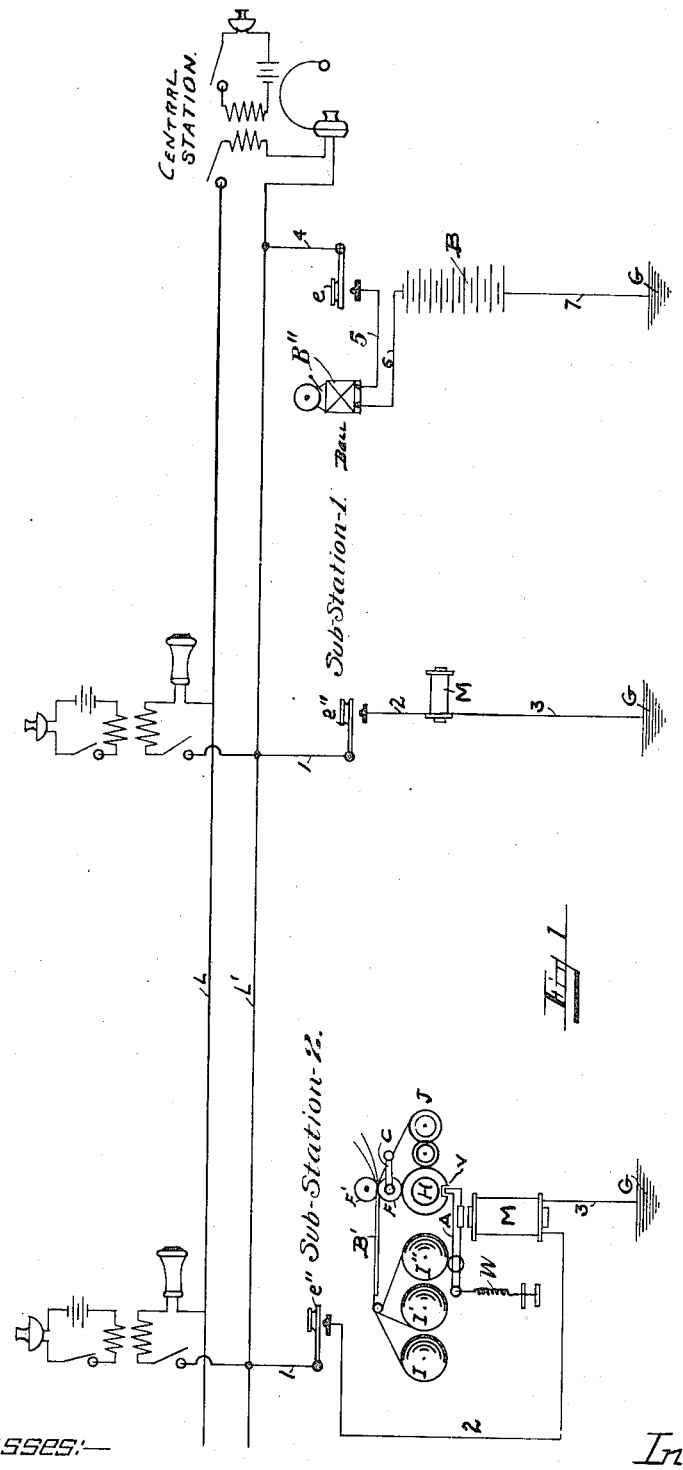

O. W. HART.
MESSAGE DELIVERY SYSTEM.
APPLICATION FILED AUG. 28, 1913.

1,162,159.

Patented Nov. 30, 1915.
10 SHEETS—SHEET 1.

Witnesses:—
Francis S. Boden
Geo. E. ___

Inventor:—
Orlando W. Hart

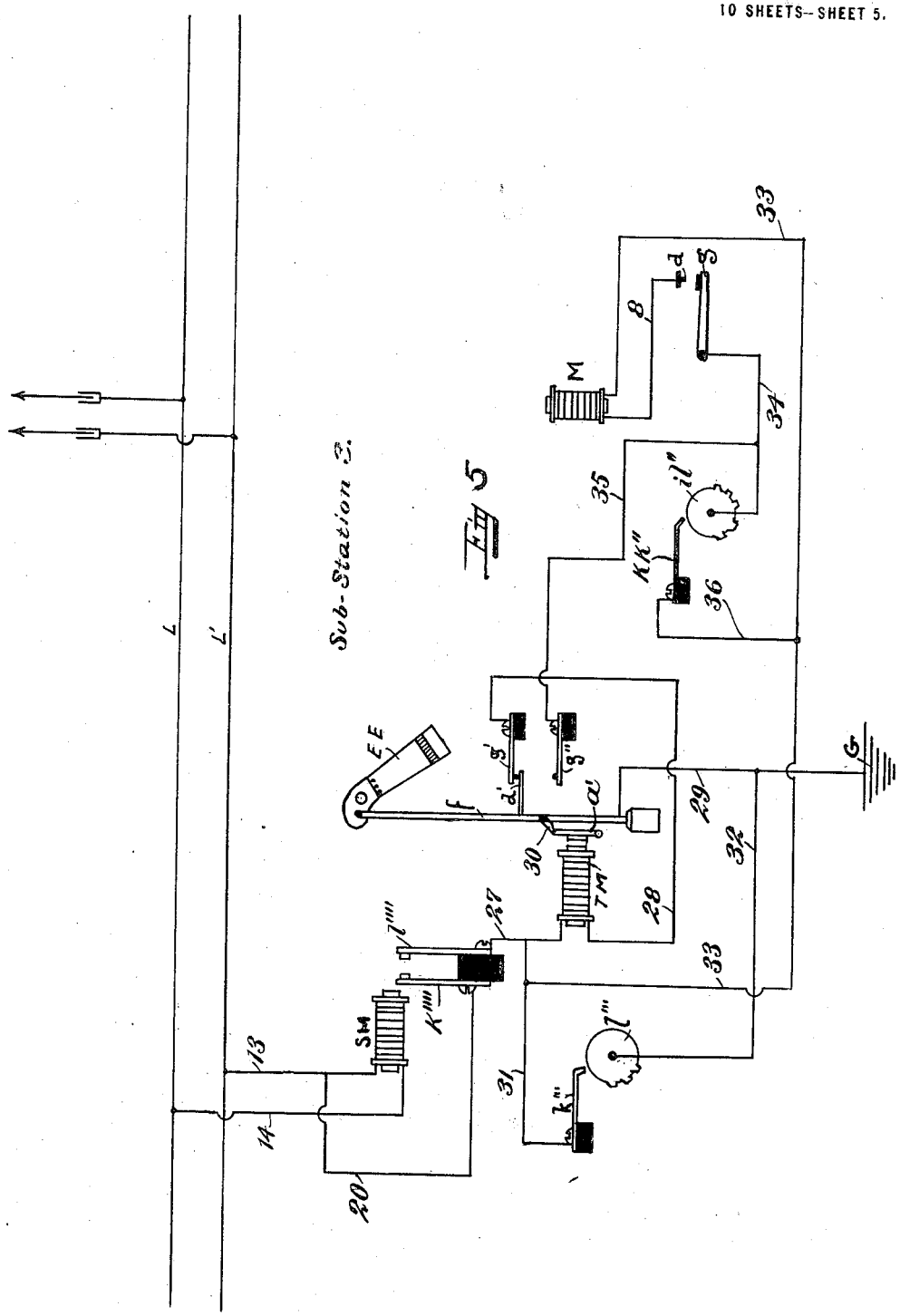

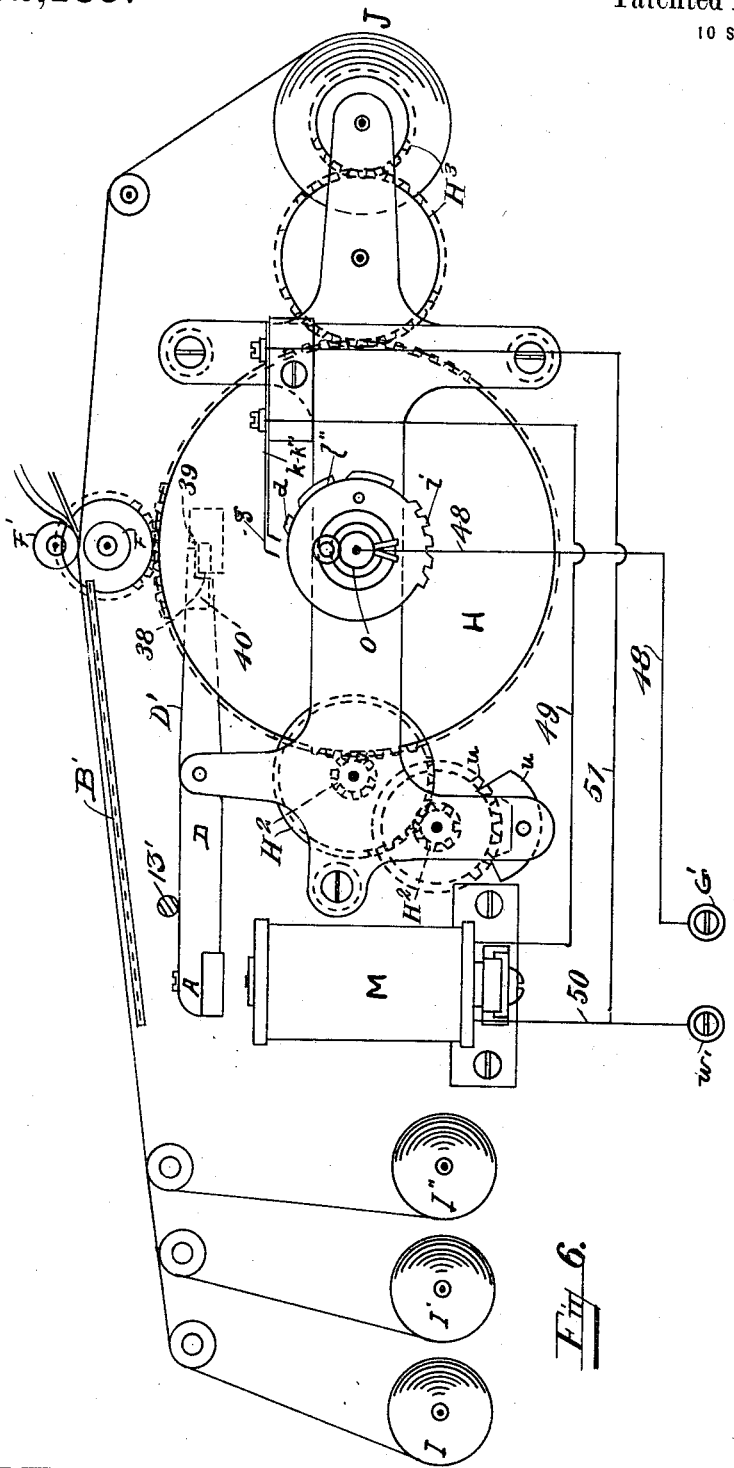

O. W. HART.
MESSAGE DELIVERY SYSTEM.
APPLICATION FILED AUG. 28, 1913.
1,162,159.
Patented Nov. 30, 1915.
10 SHEETS—SHEET 7.
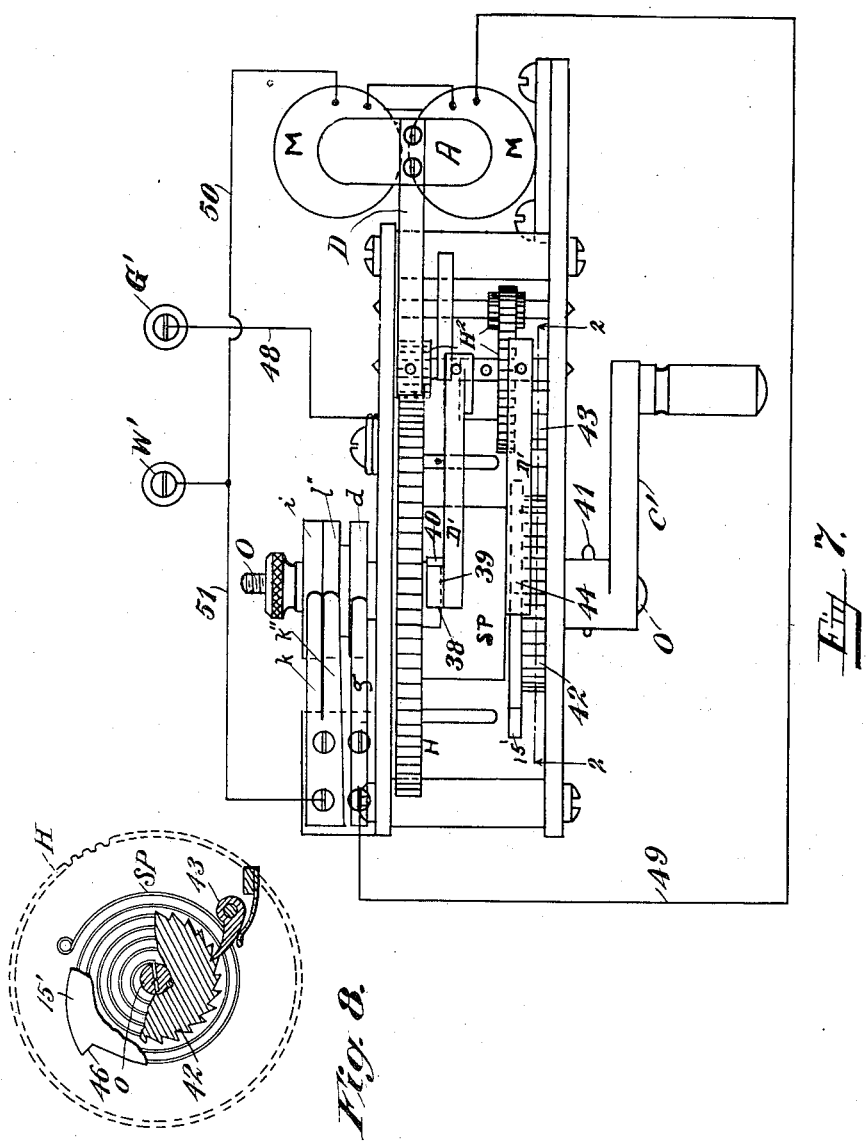

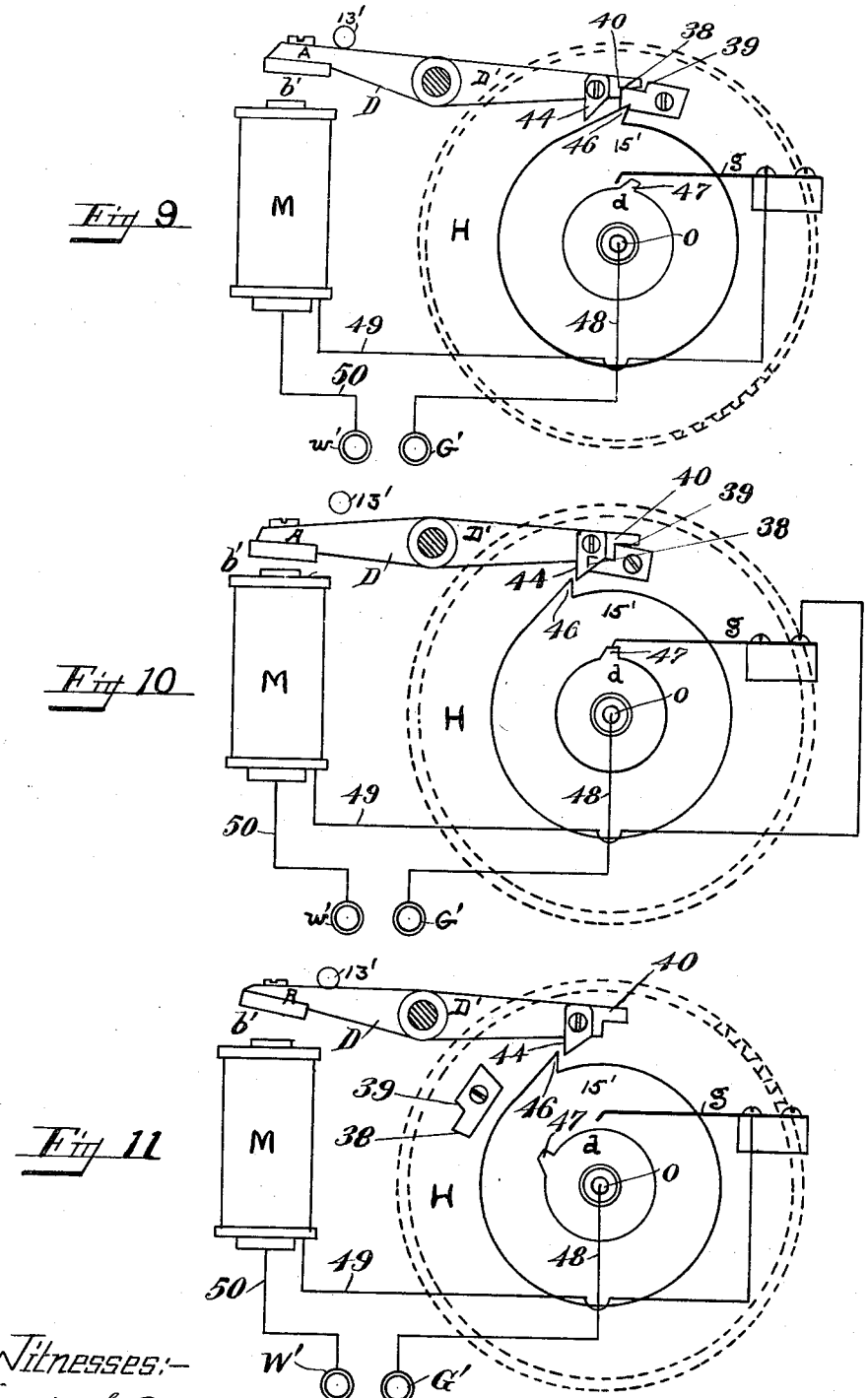

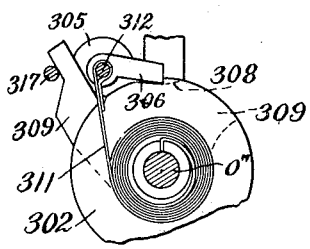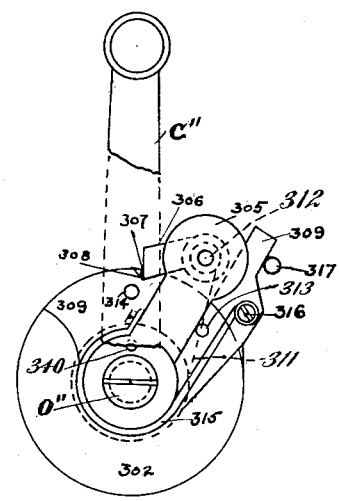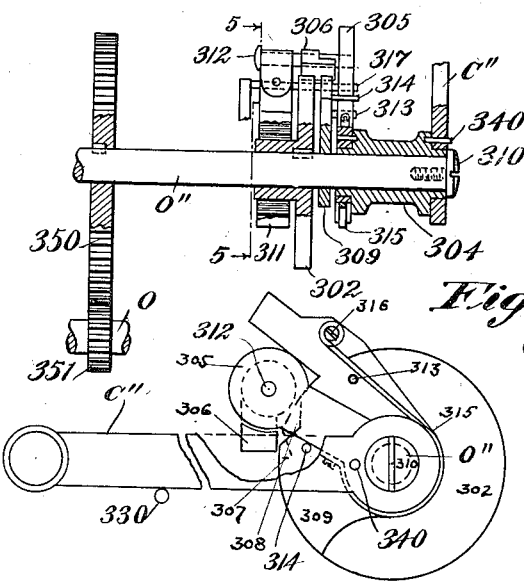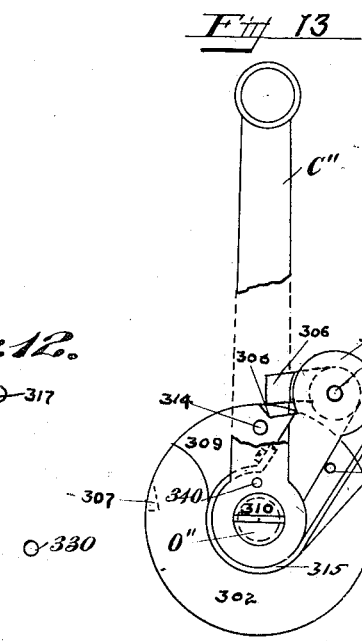

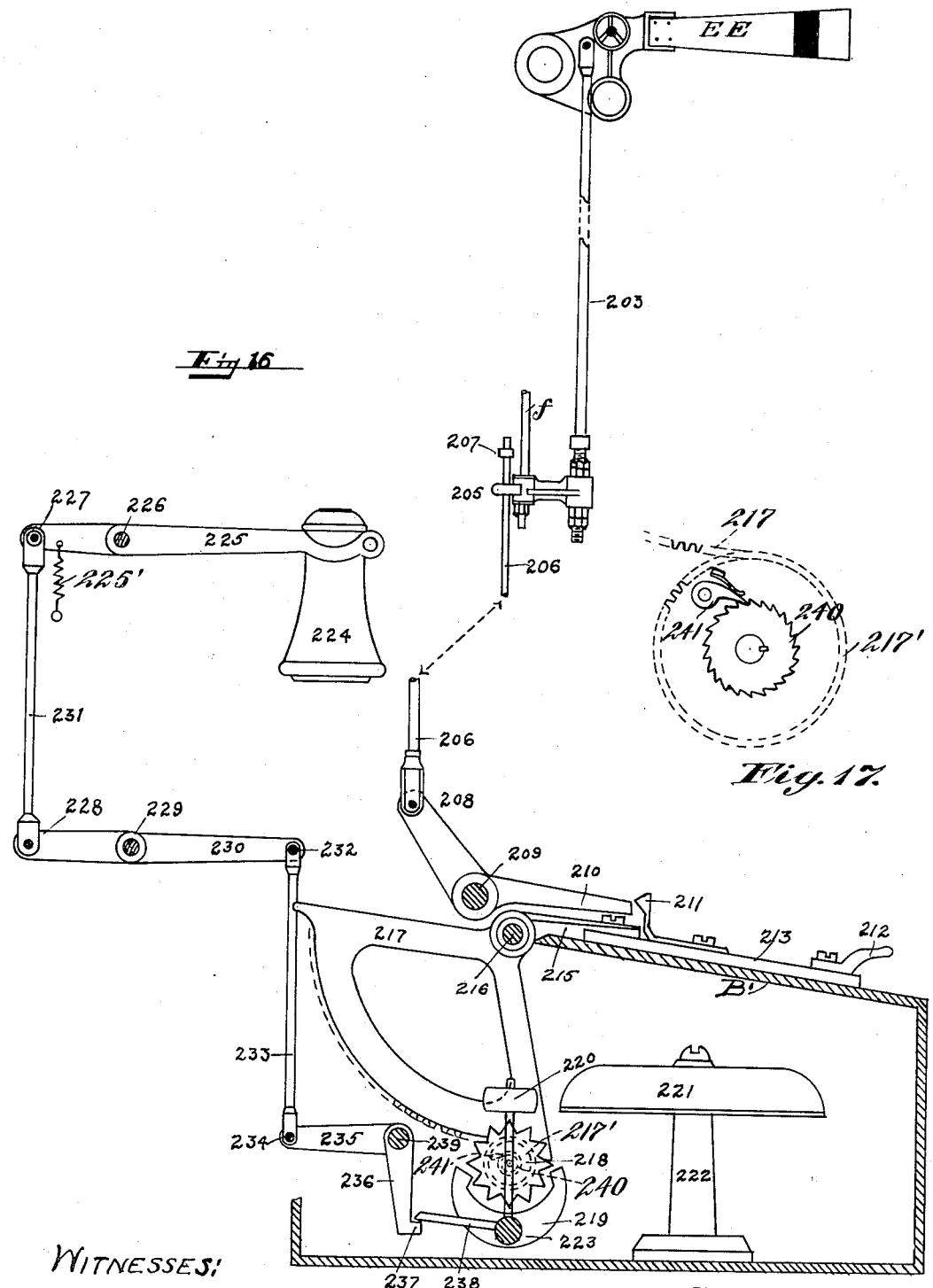

UNITED STATES PATENT OFFICE.

ORLANDO W. HART, OF FALL RIVER, MASSACHUSETTS.

MESSAGE-DELIVERY SYSTEM.

1,162,159.

Specification of Letters Patent.

Patented Nov. 30, 1915.

Application filed August 28, 1913. Serial No. 787,234.

*To all whom it may concern:*

Be it known that I, ORLANDO W. HART, a citizen of the United States, and a resident of Fall River, county of Bristol, and State of Massachusetts, have invented certain new and useful Improvements in Message-Delivery Systems, of which the following is a description.

My invention relates to message delivery systems and more particularly to a message delivery system which is especially adapted for railroad practice or the like, and wherein the delivery of a recorded or written message or order at a certain point, such as a sub-station on a line, is controllable from a remote point, such as the central station on the line.

In general, the system embraced by the present invention consists of a message delivery means or arrangement comprising a central station united by a line circuit with one or more sub-stations and a message delivery device at each sub-station controllable from the central station over the line circuit, in combination with a signaling means or arrangement comprising a signal at each sub-station and suitable means, preferably operable over said line circuit, whereby said signals are controllable from the central station to call attention to the sub-stations, and with suitable means providing for intercommunication between the central station and the sub-stations and whereby the desired orders or messages may be transmitted from the central station to the sub-stations to be recorded or written on suitable material with which the message delivery devices are provided. Each of the message delivery devices preferably comprises an autographic register provided with means, such as a plurality of strips of paper with carbon paper disposed between the several strips, whereby any message or order may be recorded or written in manifold, and suitable means, either manual or motive, though preferably the latter, for operating the register, the register being so constructed and arranged that on the operation thereof one or more copies of a message or order may be delivered therefrom and one copy of the message or order retained therein.

While other signaling means may be employed, I preferably employ a signaling system similar to that described and claimed in Patent No. 901,441. granted to me October 20, 1908. Also, while other means may be utilized in my invention to provide for intercommunication between the central station and the sub-stations, the means I preferably provide for this purpose consists of a telephone system wherein the telephone circuit preferably includes the line circuit connecting the central station and sub-stations.

The principal objects of my invention are as follows:—First, to provide means whereby an operator at one place, as a central station, may control the delivery of a message or order manually written at a distant point, such as a sub-station, so that the delivery of the message at the distant point or sub-station may be rendered certain without the need of depending on the presence of a regular operator at such distant point or sub-station; second, to provide means for transmitting to the central station an indication or answer back of the operation of the message delivery device at a sub-station and also, in a system where there are a plurality of sub-stations, a signal or answer back characteristic of the sub-station at which any message delivery device is located upon the operation of the latter; third, to provide means for recording and timing at the central station, the delivery of a message at a sub-station; fourth, to provide means whereby an operator at one place or a central station, may selectively control the operation of the message delivery devices at a plurality of points or sub-stations; fifth, to provide suitable means including a signal controllable from the place or central station from which a message delivery device is controllable to attract or call the attention of the person or persons to whom it is desired to deliver a message or messages, to the place or sub-station at which such device is located, and where there are a plurality of places or sub-stations at which message delivery devices are located, to provide means for selectively controlling from the central station a plurality of such signals which are respectively located at such places or sub-stations; sixth, to provide an arrangement whereby, when a telephone set is employed as the means for intercommunication between the central station and sub-stations and the telephone circuit includes the line circuit of the message delivery means or arrangement, the telephone circuit will not be complicated, unbalanced or overloaded, and also to avoid these contingencies when, in addition, the signals at the sub-station are controllable over such line circuit; seventh, to provide protective means for the material of each message delivery device on which the messages or orders transmitted from the central station are adapted to be recorded or written, which means is preferably adapted to coöperate with the corresponding signal of the signaling means or the corresponding telephone instrument, or both, to prevent persons from tampering with said material or writing thereon except at the proper time; eighth, to provide an arrangement whereby the operation of the delivery device at any place or sub-station may be controlled from a given point, such as the central station, only when the corresponding signal is at a certain position, such as "stop" position; ninth, to provide a message delivery device of such construction as to render the same interchangeable for use at any one of a plurality of places or sub-stations on a line; tenth, to provide a message delivery device with means whereby, upon each operation of the device, only a predetermined amount or length of material on which the messages or orders are recorded may be delivered; eleventh, to provide means comprising a motor adapted, when a message delivery device has been rendered operative, to automatically operate the autographic register of the said device a predetermined amount so as to deliver a message or ordei of a certain length and also preferably to store a duplicate thereof in the register; twelfth, to provide a system wherein an electro-magnet is employed for controlling the message delivery device at any sub-station and wherein such magnet is normally removed from the circuit connecting the sub-station and the central station, but which may, under certain conditions, be readily connected in said circuit; thirteenth, to provide a system wherein the message delivery device at a place such as a sub-station, is controllable by some currents over the line circuit connecting such sub-station and the central station but not by others; fourteenth, to provide a system wherein at each sub-station a common selector instrument controllable from the central station is employed for the corresponding signal and message delivery device; fifteenth, to provide a system comprising coöperating signaling means, message delivery means, and telephonic means, all including the line circuit connecting the central station and sub-stations; sixteenth, to provide a system of this character wherein all parts may be readily restored to normal position; seventeenth, to prevent the winding of the motor of the message delivery device at any sub-station of the system, when the protective cover for such device is in protecting or closed position; eighteenth, to provide an arrangement whereby when the protective cover for the message delivery device at a sub-station is moved from protecting position, indication thereof will be transmitted to the central station; nineteenth, to provide a construction whereby, after the winding operation of the motor for a message delivery device has been completed, any interference with the operation of the motor by the winding means is prevented.

Other objects and features of my invention will be hereinafter more fully described and claimed.

Figure 2:
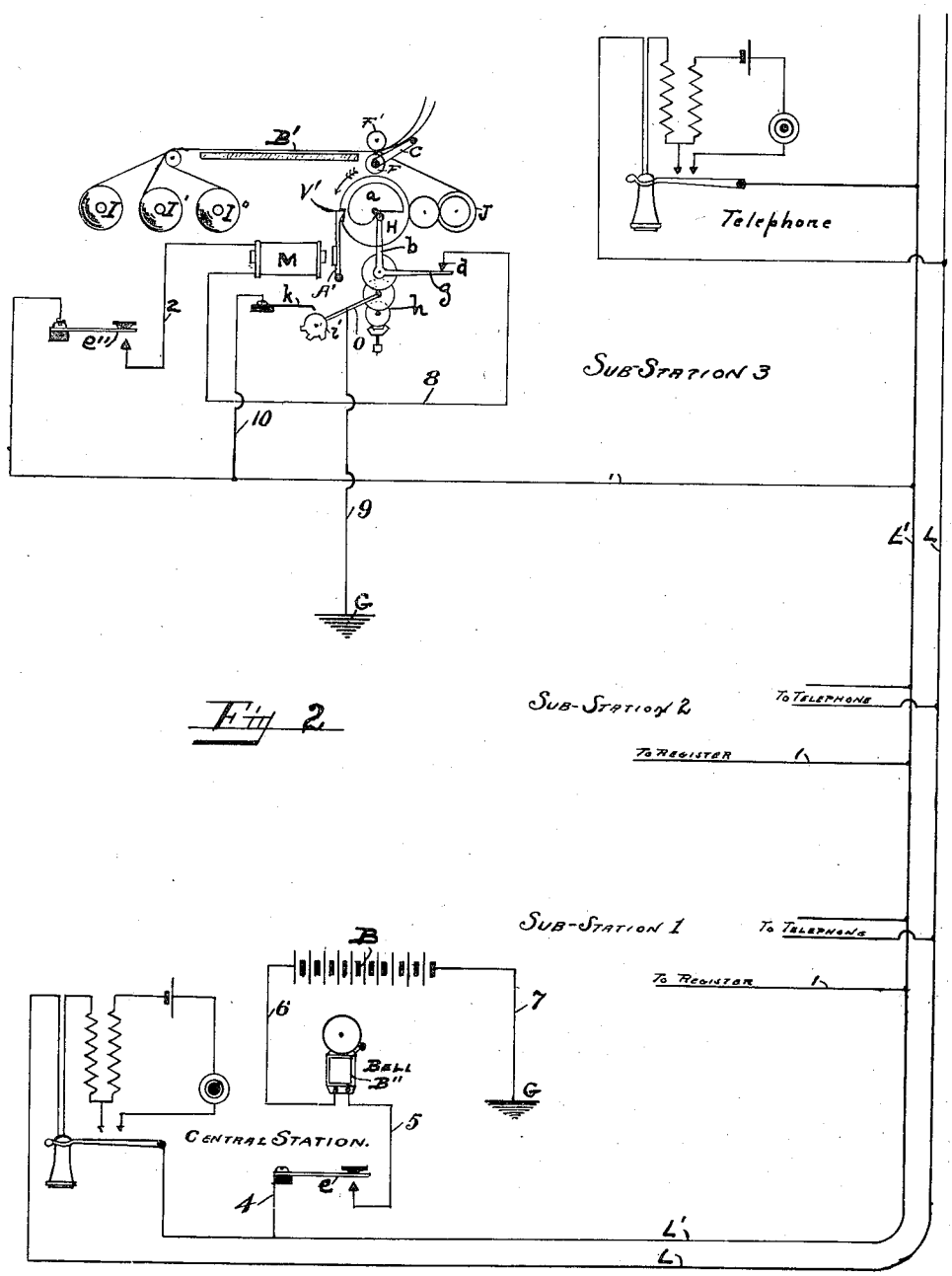
Figure 3:
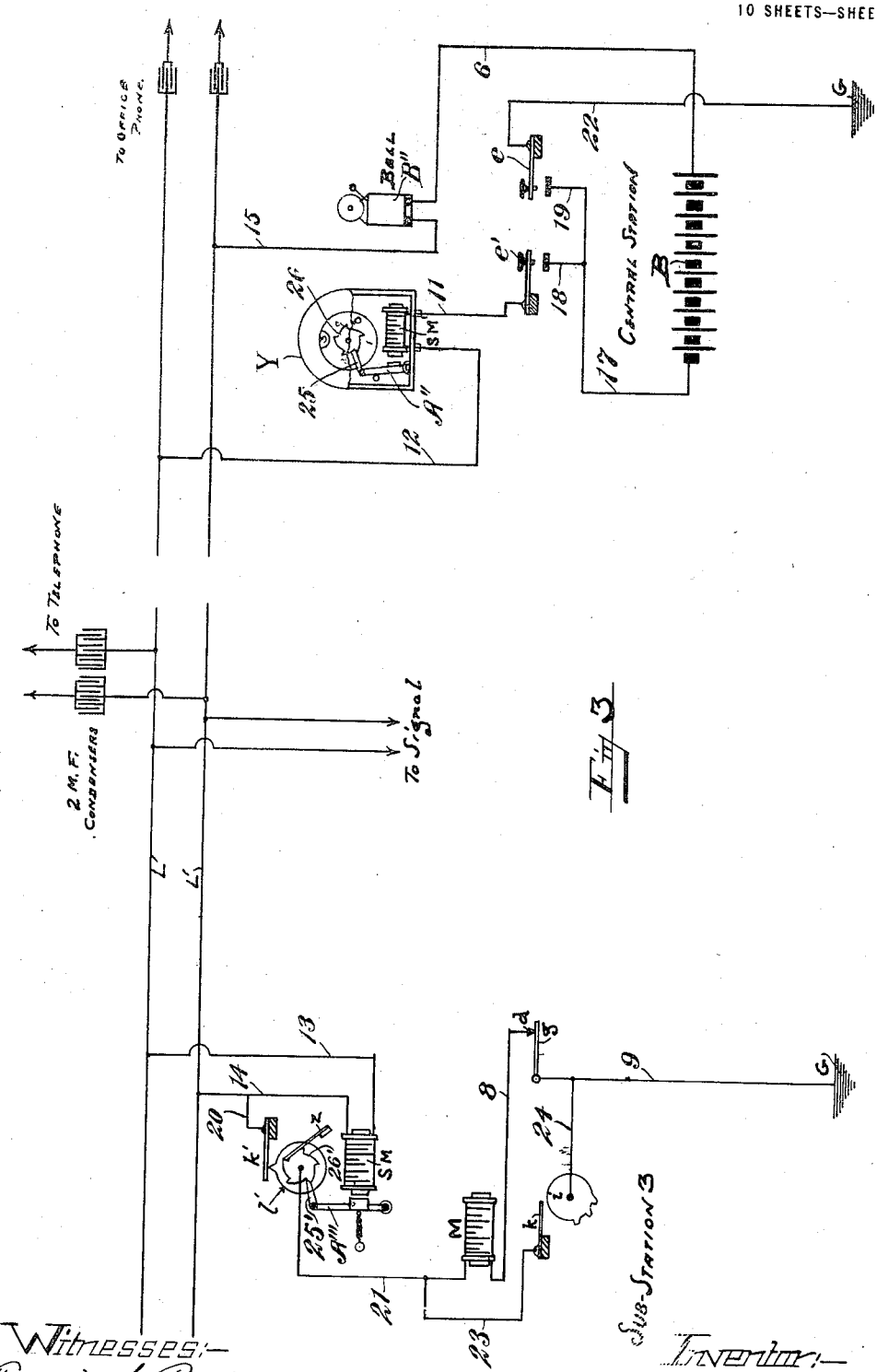
Figure 4:
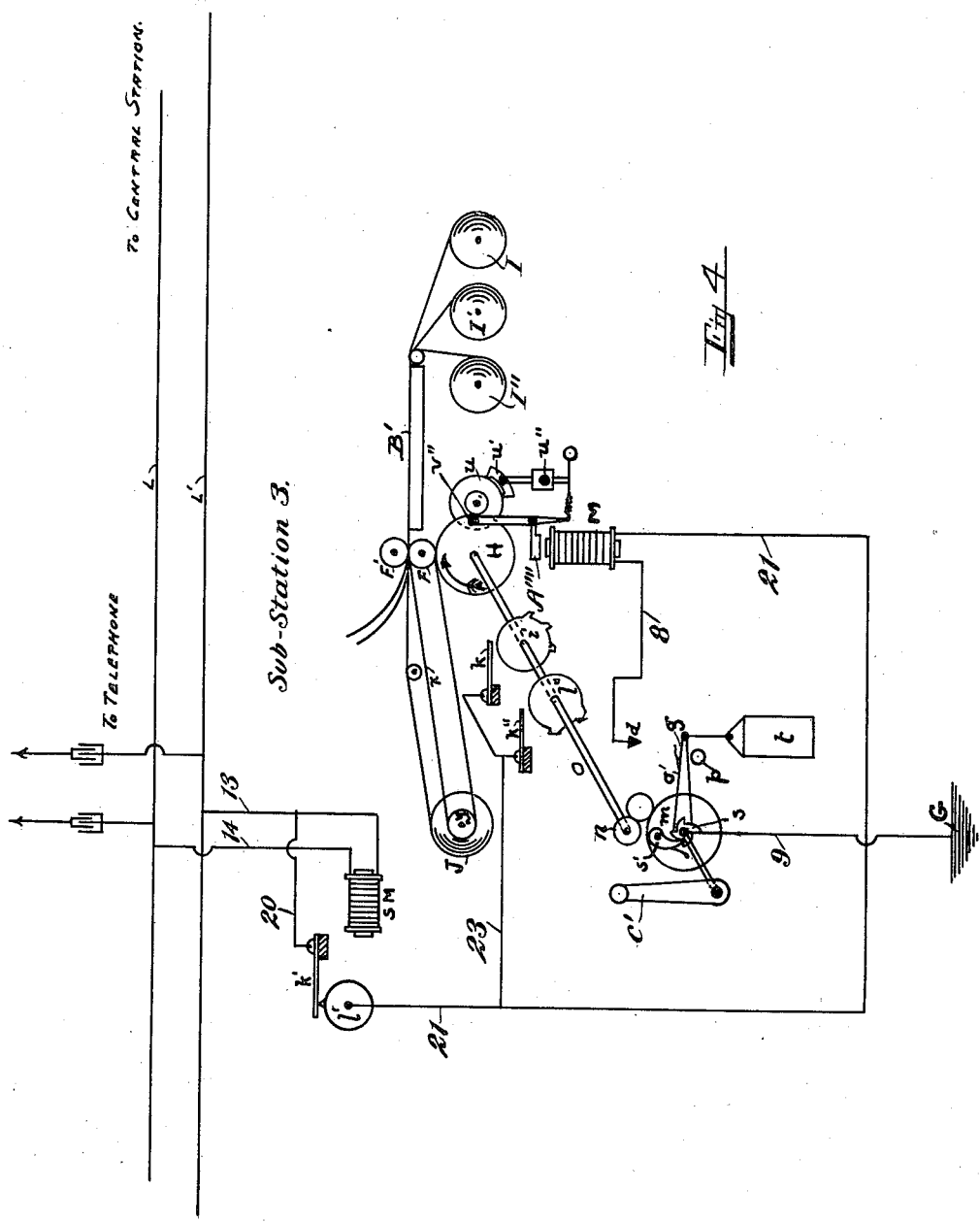

For a clearer understanding of my invention, attention is directed to the accompanying drawings forming a part of this specification, in which several simple and several more complicated embodiments of my invention are illustrated, and in which:

Figure 1 is a diagrammatic view of a comparatively simple form of my invention, wherein the rendering operative of the delivery device at a sub-station depends upon both a person at the sub-station and the operator at the central station; Fig. 2 is a similar view of a modified form of my invention, wherein means is provided for transmitting to the central station from any sub-station, an answer back characteristic of such sub-station and indicative of the operation of the message delivery device thereat; Fig. 3 is a similar view of a further modified form of my invention, wherein provision is made for selectively controlling from the central station the devices at a plurality of sub-stations, and wherein the rendering operative of a message delivery device at any sub-station is entirely under the control of an operator at the central station; Fig. 4 is a diagrammatic view of a part of a message delivery system in accordance with my invention, showing a modified form of message delivery device which may be employed at the sub-stations of a system such as is illustrated in Fig. 3, wherein a motor controllable from the central station is employed to operate the message delivery means, and wherein means, in addition to the answer back means, is employed for transmitting to the central station an indication of the operation of the message delivery means; Fig. 5 is a diagrammatic view illustrating in part, a still further modification of my invention, wherein a signaling system embodying signals at the sub-stations which are selectively controllable from the central station, is employed in conjunction with a message delivery arrangement such as shown in Fig. 4; Fig. 6 is a view in side elevation showing somewhat diagrammatically, a modified form of motor-operated message delivery device which may be employed in my system, the controlling means for the motor thereof and the electrical connections thereto; Fig. 7 is a somewhat diagrammatic plan view of the apparatus shown in Fig. 6, parts being omitted; Fig. 8 is a sectional view, partly broken away and with parts omitted, taken on line 2—2 of Fig. 7; Fig. 9 is a diagrammatic view illustrating the relative and normal positions of certain parts of the apparatus shown in Figs. 6 to 8, that is, the positions of these parts when the motor is in inoperative condition or deënergized; Fig. 10 is a similar view showing the relative position of the parts after the motor has been wound, but before the release thereof; Fig. 11 is a similar view showing the relative position of the parts after the motor has been released and has completed a part of its operation; Fig. 12 is a side elevational view partly in section and partly broken away, of novel winding means which may be used for the motor of a message delivery device such as is shown in Fig. 4 or in Figs. 6 to 8; Fig. 12ª is a sectional view, partly broken away, taken on line 5—5 of Fig. 12; Fig. 13 is a front view, partly broken away, of the winding means illustrated in Fig. 12, showing the relative normal position of the parts; Fig. 14 is a view similar to Fig. 13 showing the relative position of the parts at the completion of a winding operation and just after relieving the winding crank from the winding pressure; Fig. 15 is a view similar to Fig. 13, showing the relative position of the parts after the winding crank has been returned to normal position but before operation of the motor; Fig. 16 is a view in elevation, partly in section, partly broken away, and with parts omitted, showing the protective cover for the autographic register of a message delivery device employed in my invention, and means whereby the signal and telephone receiver at the sub-station where the said device is located, coöperate with and control said cover; and Fig. 17 is an enlarged detailed view of the connection between the protective cover shown in Fig. 16 and the alarm operable thereby.

A simple embodiment of my invention is shown in Fig. 1, wherein message delivery devices, each comprising an autographic register, are respectively disposed at a plurality of sub-stations connected by a line circuit with the central station, and wherein the telephone system includes said line circuit. Any of the well known commercial forms of autographic registers and telephone systems may be employed to answer the purposes of this form of my invention and the same therefore do not need to be described in detail.

It is desirable to produce in the delivery device at a sub-station, one original copy and two or more duplicate copies of any message or order. This is done by writing with a pencil on that portion of the uppermost of three layers of paper from the rollers I, I' and I'' disposed over pad B'. Between the layers of paper from these rolls carbon papers are held in position so that the message paper may be moved along and the carbon paper used to copy several messages thereon. After the message has been inscribed as received over the telephone from the central station, the handle C is turned, thereby effecting the turning of rollers F, F', which are in geared relation to each other and so arranged as to exert a pressure on the paper from the rollers I, I' and I'', which passes between them. As the paper advances, portions of the strips from rollers I and I' are delivered outside the casing of the register to be torn off at the proper point, while a corresponding portion of the strip of paper from roller I'' is wound on a friction take-up roller J, which is in geared relation to the crank C, to thereby retain a true copy of the original message or order as inscribed on the uppermost layer of paper at pad B'.

A notched wheel H which is in geared relation to handle C, acts as a stop for the latter when a certain length of paper, suitable for the message, has been delivered. This is accomplished by reason of the coöperation of the pivoted armature A of magnet M with the notched wheel H. Armature A is provided with a detent which is adapted to engage the notch V of wheel H to lock the latter and thereby the register. Spring W holds armature A in an engaged position so long as magnet M is not energized, and thus prevents the operation of handle C and the delivery of messages from the register. When the order has been telephoned from the central station to an outlying sub-station, a message cannot be taken until the operator releases the delivery device from the central station by effecting the energization of the magnet M. When ordered to do so, the person at the sub-station presses button $e''$, the operator at the central station also presses button $e$, thereby completing the battery circuit, and current will flow from battery B through conductor 7 to ground G, then through conductor 3, magnet M, conductors 2, $l$, L', 4 and 5, bell B'', and conductor 6 to battery B. When the circuit has been made complete, armature A is attracted by magnet M and releases the notched disk H, permitting the handle C to be turned. As soon as the disk H has been started, the operator at the central station releases key $e$ which opens the battery circuit, thereby deenergizing magnet M, and allows spring W to move armature A to a position to engage the notch or slot $r$ in disk H to lock the delivery device, when said disk has reached the proper position, viz.: after one revolution of the same. The releasing of key $e''$ may accomplish the same end, and when bell B″ stops ringing, notice is given to the operator at the central station that the message is being taken at the distant sub-station. This is a simple but not a very practical embodiment of my invention, for when key e at the central station is pressed, the message delivery device at any sub-station could be operated, upon pressing the corresponding key e″, and the operator at the central station would be unable to tell which one of the message delivery devices was operated. In order to obviate this defect, I provide a system such as described above, with answer back means as shown in Fig. 2. In the system shown in this figure, tl same type of autographic register, together with the magnet M, disk H having the notch v′, and armature A′ having a detent adapted to engage notch v′, are employed, but in addition a cam a is fixed to the disk H and is so arranged that when armature A′ releases disk H by disengaging notch v′ thereof and the handle C is turned, under orders given from the central station, the cam a will act on a lever b and wind a spring which in turn operates a train of wheels h having a shaft o provided with a break wheel i which coacts with a wiper spring k to effect the transmission of a signal characteristic of the sub-station at which the autographic register is being operated, to the central station in a manner similar to signal box mechanism. Attached to the lever b is a contact arm g which coacts with a stationary contact d and which is adapted upon the operation of crank C to at once open the circuit through the magnet M at d. When a message has been received at a sub-station by telephone and copied on the register, orders are given to take the message. Keys e and e″ are pressed at the central station and sub-stations respectively and current from battery B will flow through conductor 7 to ground G, then through conductor 9, shaft o, train h, contacts g, d, conductor 8, magnet M, conductors 2, l, L′, 4 and 5, bell B″, and conductor 6 to battery B. The keys e and e″ being held in circuit-closing position, bell B″ will ring until the crank C is turned and the circuit thereby opened at d, g.

As soon as a complete revolution of disk H has been made, the armature A′ engages notch v′ of disk H to lock the register. At the same time, cam a releases lever b and the spring operated train h, which is provided with a suitable escapement, turns shaft o and break wheel i and effects the transmission of a number of impulses equal to the number of teeth on the break wheel i over the following circuit: B, 7, G, 9, o, i, k, 10, l, L′, 4, e, 5, B″, and B. The bell B″ responds to the impulses so sent giving the number of the sub-station. In this system, should two or more persons at different sub-stations on the line try to take messages from the different registers at the same time, a confused and unintelligible answer back would be transmitted to the central station. While this system and also that shown in Fig. 1 will operate on a single line when only one delivery device on the line is in operation, both are somewhat unsatisfactory for use when a plurality of the message delivery devices on the line are at all liable to be operated at the same time. In Fig. 3 I have illustrated an improved form of system having suitable selecting means whereby the delivery devices at a plurality of sub-stations may be selectively controlled from the central station. It will be noticed that the selector instruments in this system are in a multiple or bridged relation to each other, as the advantages of individuality with the multiple circuit are such that I prefer to use it. It will be seen that telephonic conversation is carried on over line wires L, L′ through condensers, it being well known that the telephonic currents will operate satisfactorily on combination lines under these conditions.

In the system shown in Fig. 3, a simple selecting means of the well known step by step type is employed, but this system will operate equally as well with selector systems having periods of time and polarity. I prefer, however, to employ a selective system such as disclosed in my Patent No. 901,441 hereinbefore mentioned. At sub-station 3 in Fig. 3 is shown a simple selector and a register operating magnet M for releasing an autographic register, not shown, but similar to that shown in Fig. 2. At the central station is a telltale or indicator Y that will show the sub-station in connection with the central station at any time. In order to release the message delivery device at a sub-station, for example, sub-station No. 3, the operator at the central station actuates key e′ a number of times sufficient to bring figure 3 in the open space of the casing of the indicator Y, which shows that contacts l′ and k′ are in contact and that the delivery device at sub-station 3 may be released from the central station to deliver a message. Each time key e′ is actuated, a circuit is made over the following path: 11, SM′, 12, L, 13, SM, 14, L′, 15, B″, 6, B, 17 and 18, thereby causing bell B″ to ring and also the indicator Y and the selector at sub-station 3 to be advanced one step by means of the action of armatures A″ and A‴, pawls 25 and 25′, and ratchets 26 and 26′, in a manner well known. The selector is provided with a pawl z which coacts with ratchet 26′ and prevents backward movement thereof. Contacts k′, l′ being in circuit-closing position, key e is now pressed and a circuit is made over the following path: 19, 17, B, 6, B'', 15, L', 14, 20, k', l', 21, M, 8, d, g, 9, G—G, and 22 to start. This releases the operating crank C, as described in connection with the form of my invention shown in Fig. 2, and when the message has been delivered, the answer back is sent to the central station over the following circuit: i, k, 23, 21, l', k', 20, 14, L', 15, B'', 6, B, 17, 19, e, 22, G—G, and 9. Indication that the message has been taken from the register is audibly sounded by the bell B''.

The system shown in Fig. 3 possesses many desirable features, but as the delivery devices thereof are manually operable, and consequently the operation thereof is dependent on the persons at the sub-stations performing the proper acts within a certain time, the same is not altogether satisfactory. It being desirable to provide means for operating the registers independently of the persons at the sub-stations, I have devised the form of message delivery device shown in Fig. 4. The selecting means shown in Fig. 4 is the same as is shown in Fig. 3, all the improvements in the arrangement shown in Fig. 4 being in the message delivery device and its automatic operating means. This device consists of the paper rolls I, I' and I'', copying pad B', rollers F, F', a take-up roll J for the strip of paper from roll I'' having copies of the messages which are to be retained in the register, means such as belt $x$ and pulley $y$ for operating roll J from roller F and for keeping the paper wound on this roll, under tension, and the wheel H in geared relation to roller F and arranged to make one revolution upon each message delivery operation. The gear H is controlled by the spring-pressed armature A'''' of magnet M, this armature coacting with a stop or detent $v''$ on gear H to always arrest the latter at a predetermined position thereof.

Fixed on shaft $o$ are break wheels $i$ and $l''$, the teeth of wheel $l''$ being in advance of the teeth on wheel $i$, and a gear $n$, the latter being in geared relation to a gear $m$ of the automatic operating means or motor. Gear wheel $m$ is operable by a weight $t$ at the end of arm $o'$, and the coacting ratchet $s$ and pawl $s'$; the arm $o'$ and ratchet $s$ being secured to the shaft of the winding crank $c'$, which shaft is unattached to gear $m$, and the pawl $s'$ being carried by gear $m$. The downward movement of weight $t$ is limited by a stop $p$. The wheel $m$ is so designed as to turn gear $n$ one complete revolution for every 90° of its travel. When the weight $t$ is lifted to its highest point by turning crank $c'$ to the left, a contact is established between $g$ and $d$ and an unbroken electrical connection is established between the selector contacts and the ground connections. The speed at which the message is delivered is regulated by the star gear or wheel $u$ geared to disk H, and the escapement $u'$ and pendulum $u''$ coöperating therewith, whereby a distinct answer back will be effected by the action of the break wheels $i$ and $l''$. The break wheel $l''$ has a number of teeth of such lengths as to effect an answer back indicative of message delivery, while wheel $i$ is provided with the proper number of teeth to effect an answer back characteristic of the number of the sub-station. The mode of operation is as follows: When the substation has been selected from the central station through the line wires L, L', conductors 14 and 13, and magnet SM, a contact is established between $k'$ and $l'$. The message dictated by telephone from the central station having been written on the paper at pad B', the person at the sub-station is ordered over the telephone to "wind the register", which he does by turning crank $c'$ to the left, thereby raising weight $t$ and establishing a contact between $d$ and $g$, the weight being then held in raised position by pawl $s'$ and ratchet $s$. If it is now desired to deliver a message, the proper operation is performed at the central station to send a current impulse over the circuit path L', 13, 20, $k'$, $l'$, 21, M, 8, $d$, $g$, 9 and G, whereupon magnet M will be energized and attract armature A'''', thereby releasing disk H and allowing weight $t$ to fall and, through arm $o'$, ratchet $s$, pawl $s'$, and gears $m$ and $n$, to operate the delivery device. As the weight falls, the contact between $g$ and $d$ is broken and armature A'''' assumes its normal position and will again engage the stop $v''$ on disk H after a complete revolution of the latter. During the revolution of disk H by the weight motor, the teeth on break wheels $i$ and $l''$ will make and break contact with wiper springs $k$ and $k''$ respectively to effect the transmission of two distinct answer backs to the central station, one being indicative of message delivery and the other characteristic of the sub-station.

By the use of message delivery devices of the type shown in Fig. 4 in an arrangement such as shown in Fig. 3, I obtain a fairly practical system; but as my invention is designed primarily for use on railroads to deliver written train orders which have been transmitted by telephone from a central station, to sub-stations on the line where no regular operators are employed, signaling means should be employed whereby a signal may be set from the central station, at a substation where an order is to be given to a train crew, so as to give notice to the crew on their arrival at such substation to stop and get the order. I preferably employ for this purpose a selective signaling system of the type disclosed in my patent hereinbefore mentioned. Separate selectors for the signal and the register at each substation, however, load the line circuit so much as to make it "heavy" for use as the telephone line. Accordingly, I provide a system in which selective signaling means similar to that disclosed in my Patent No. 901,441 is employed, but which is so arranged as to employ a common selector for the signaling means and message delivery device at each substation, as shown in Fig. 5.

Referring to Fig. 5, the conductors 13 and 14 connected to the selector magnet SM, are in multiple relation to the line wires L, L'. When selection has been made and the gap between contacts $k''''$ and $l''''$ is bridged, a tripping current is sent from the central station. The circuit path for the tripping current is through L', 13, 20, $k''''$, $l''''$, 27, TM, 28, $g'$, $d'$, $f$, and 29 to ground G. Magnet TM on being energized attracts armature $a'$ and releases rod $f$ at 30. Semaphore E, E then moves to a "stop" position, thereby breaking the circuit at the drop switch $g'$, $d'$ and operating the answer back movement $k'''$, $l'''$, thus causing a number of impulses corresponding to the teeth on the break wheel $l'''$ to be sent to the central station over the circuit path L', 13, 20, $k''''$, $l''''$, 27, 31, $k'''$, $l'''$, 32, 29 and G, and transmitting intelligence that the signal is set at a "stop" position. When the signal moves to this position rod $f$ brings $d'$ into contact with $g''$, but as the message delivery circuit is open at $d$, $g$, this in no way interferes with the signal circuit. This arrangement prevents the operation of the message delivering device being effected from the central station until the signal is at a "stop" position and $d'$ in contact with $g''$.

It will be apparent that before the magnet M can be energized by an operation performed at the central station, the contacts $d$, $g$ must also be brought into contact by a manual operation performed at the substation, which manual operation will also place the motor for the message delivery device in operative condition. These conditions having been fulfilled and an order having been transmitted by means of the telephone to the desired sub-station and inscribed on the corresponding autographic register by the person who is to take the written message, the motor of the delivery device may be rendered operative, from the central station, to actuate the register and thereby effect the delivery of the message, in the manner above described. When the sub-station has been selected and the controlling circuit for magnet M has been closed at $d$, $g$ as described, the operator at the central station closes such circuit at the central station, whereupon a current passes over the path L', 13, 20, $k''''$, $l''''$, 27, 31, 33, M, 8, $d$, $g$, 34, 35, $g''$, $d'$, $f$, 29 and G. This energizes magnet M and thereby releases the message delivery device, permitting the motor thereof to actuate the register and deliver the message. Upon the operation of the motor, the motor controlling circuit will be opened at $d$, $g$ as previously described, and the break wheel $i$, $l''$ will be rotated, and the teeth of said wheel will make contact with the spring $k$, $k''$ and effect the transmission to the central station, of an answer back indicative of the operation of the delivery device and an answer back characteristic of the sub-station, over the circuit path L', 13, 20, $k''''$, $l''''$, 27, 31, 33, 36, $k$, $k''$, $i$ $l''$, 34, 35, $g''$, $d'$, $f$, 29 and G. Means are preferably provided for recording and timing at the central station the answer backs transmitted from the sub-stations, both by the signals and the message delivery devices, this means preferably being similar to that disclosed in my patent hereinbefore mentioned. Such means is also preferably employed in the systems as shown in Figs. 2, 3 and 4, to record and time the answer backs transmitted to the central station on the operation of the message delivery devices. A system embodying the features described in connection with and disclosed in Figs. 3, 4 and 5 has proved very efficient in practice and has no serious defects. By keeping magnet M out of the signal controlling circuit, the dangers thereto from lightning and other causes are largely obviated.

Figs. 6 to 8 show a very simple and efficient type of motor-operated message delivery apparatus, which may be employed in any of the systems hereinbefore described. Referring more particularly to these figures, strips of paper from the rolls I, I' and I'' pass over the pad B', where carbon paper is interposed between the different strips, and then between the advancing rollers F, F'. After leaving rollers F, F' the paper strips from rolls I and I' are delivered outside the casing for the mechanism, while the paper from roll I'' is wound on the roll J which is inside the casing. H is a large main gear which is rotatably mounted on the shaft $o$ and is adapted to be driven by the motor of the apparatus when the latter is released, as will presently appear. Gear H is geared to roller F to rotate the same and roller F' to advance the paper from rolls I, I' and I''. The gear H is also operatively connected by gearing $H^3$ to roll J to actuate the latter. An escapement mechanism $u$, $u'$ is operatively connected by gearing $H^2$ to gear H and serves to control the speed of the delivery device when the motor is in operation. The operating means consists of a spring motor, although any other suitable motor may be employed, having a powerful coiled spring SP, one end of which is secured to shaft $o$ and the other end to gear H, as clearly shown in Fig. 8. A winding crank $c'$ is secured to the shaft $o$ by a pin 41. A ratchet 42 fixed to shaft *o* and a coöperating spring pressed pawl 43 mounted on the frame of the apparatus, prevent backward movement of the crank *c'* under the action of the motor. A disk 15' having a tooth 46 is secured to shaft *o* to turn therewith when crank *c'* is turned to wind the motor. D represents a pivoted lever which is provided at one end with the armature A for magnet M. Secured to the other end of the lever are two spaced parallel arms D', one of which is provided with a beveled projection 44 adapted to coöperate with the tooth 46 of disk 15' and the other of which is provided with a detent 40 designed to engage the shoulders 38 and 39 an escapement block secured to gear H, to hold the latter stationary. A pin 13' limits the movement of lever D away from magnet M and said lever is biased by gravity, or a spring, into engagement with this pin. When in this position the detent 40 is adapted to engage the shoulder 38 of the block on gear H, as shown in Fig. 6.

Secured to gear H and loose on shaft *o* are break wheels *i* and *l''* adapted to coact with wiper springs *k* and *k''* respectively, to effect the transmission of answer backs to the central office indicative of the operation of the delivery device and characteristic of the substation respectively, and also a disk *d* having a tooth 47 adapted to coact with the contact spring *g* to control the electrical connection of magnet M with the central station. Break wheels *i* and *l''* and disk *d* are connected by conductor 48 to a binding post G'. One terminal of magnet M is connected to contact *g* by conductor 49 and the other terminal thereof is connected to the binding post *w'* by conductor 50. Wiper springs *k* and *k''* are connected to conductor 50 between the magnet and binding post *w'* by a conductor 51. The break wheel *i* is removable so that by replacing the same by another wheel having the proper number of teeth, the delivery apparatus is adapted to be used at any desired sub-station in the system. I will now describe the operation of this apparatus and the arrangement employed to connect the same in operative relation to the central station, with especial reference to Figs. 9 to 11. Under normal conditions, that is, with the apparatus inoperative, and the spring S P run down, lever D is in engagement with pin 13', stop or detent 40 is in engagement with shoulder 38 of the block on gear H to hold the latter stationary, and tooth 47 is out of engagement with the contact spring *g* and the circuit for magnet M is accordingly open, as shown in Fig. 9. It will be seen that with the lever D in this position, the air gap *b'* is very wide and there is no danger of the armature A being attracted to release the delivery apparatus even though magnet M be energized to saturation. Moreover, the magnet M will not be in circuit until the apparatus has been manually connected into the line. When the message has been written at B', the crank *c'* is turned to put the spring S P under sufficient tension to deliver the message. The turning of crank *c'* rotates the toothed disk 15', the tooth 46 of which is so arranged that during such rotation of the disk, it will engage and move over and past the projection 44 and thereby move lever D and arms D, D' thereof, so that the detent 40 will be raised out of engagement with the shoulder 38 of the block on gear H and into the path of shoulder 39 of such block. This releases gear H, whereupon the spring S P acts to turn the same the slight amount necessary to bring the shoulder 39 into locking engagement with detent 40. This slight movement of gear H causes a corresponding movement of disk *d* to bring the same into engagement with the contact spring *g* through its tooth 46, whereby an uninterrupted electrical connection is established from G' through 48, *d*, *g*, 49, M and 50, to *w'*. Fig. 10 shows the positions of the parts shown in Fig. 9, under these conditions. It will also be noted that the air gap *b'* has now been shortened. As shown in Fig. 11, if the magnet M is now energized, armature A will be attracted and the lever D moved to disengage the detent 40 from shoulder 39 and allow the motor to complete the revolution of gear H and deliver the message, the gear H by its movement, causing a like movement of disk *d* and breaking the contact between projection 47 and spring *g*, which effects the deënergization of magnet M and thereupon the return of lever D to a position in engagement with pin 13'. Also, during the completion of the rotation of gear H, the break wheels *i* and *l''* are turned and the teeth thereof make and break contact with spring contacts *k* and *k''* respectively to effect the transmission of answer backs over the circuit path *w'*, 50, 51, 48 and G'. When the revolution of the gear H and accordingly the delivery operation of the apparatus have been completed, the position of the parts will again be that shown in Fig. 9, and will not again be changed until the handle *c'* is turned to wind the motor.

Figs. 12 to 15 show a novel form of winding mechanism which may be employed for any of the motor-operated message delivery devices hereinbefore described, whereby after the motor is wound and the winding pressure is relieved, no further control of the winding crank over the motor may be obtained until the motor has completed its delivery operation. This mechanism is preferably so designed and connected to the motor shaft *o*, that a 90° winding movement thereof will effect a complete revolution of the motor shaft. In these figures, reference character o'' represents the winding shaft which, as shown in Fig. 12, is connected to the motor shaft o by gears 350 and 351 having a 4 to 1 ratio whereby a quarter turn of shaft o'' will effect a complete rotation of the motor shaft o and thereby store sufficient energy in the motor to effect, on the release of the latter, the proper operation of the delivery device to deliver a message of the desired length. The winding crank c'' is secured by a pin 340 to one end of a sleeve 304 which is loosely mounted on shaft o'' and retained in position thereon as by a screw 310. The other end of sleeve 304 is provided with an arm 305 having secured thereto adjacent its outer end, a long transversely extending pin 312.

A gravity pawl 306 is pivotally mounted on pin 312 and is adapted to engage a notch 307 in the periphery of a circular disk 302 which is secured to the shaft o''. A coiled spring 311 which is always under considerable tension, has one end connected to the hub of disk 302 and the other end to the pin 312 beyond the pawl 306, and constantly exerts a force tending to turn arm 305 and thereby crank c'' in a direction opposite that necessary for winding. A plate 309 of peculiar shape is loosely mounted on shaft o'' between sleeve 304 and disk 302, and a small band spring 315 has one end secured to the arm 305 and the other end to the plate 309 by a pin 316. Spring 315 which is of less strength than spring 311, is under tension and tends to move plate 309, referring to Figs. 13 to 15, in a clock-wise direction with respect to arm 305 and crank c'' secured to the latter. Stop pins 313 and 314 secured to plate 309 coact with arm 305 to limit the relative angular movement of plate 309 and arm 305. Plate 309 is provided with a segmental portion, the periphery of which has the same radius as the periphery of disk 302, and a projection carrying the pin 316 and which is adapted to engage the stop pin 317 and limit the movement of the parts to the right, with reference to Figs. 13 to 15. The plate 309 is provided on the periphery of its segmental portion with a notch 308 having inclined sides. A stop pin 330 or the like is adapted to limit the winding movement of crank c'' to 90°. It will be apparent that pawl 306 can engage the notch 307 only when the plate 309 and disk 302 are in such relative positions that notches 307 and 308 register.

Fig. 13 shows the parts of the winding mechanism in normal position. When in this position, the spring 311 maintains the arm 305, in opposition to spring 315, against the pin 313 and the plate 309 against the pin 317. The disk 302 is in position with the notch 307 registering with notch 308 of plate 309 and pawl 306 is accordingly in engagement with these notches. Referring especially to Figs. 13 to 15, if the motor is run down and the parts are in normal position, as shown in Fig. 13, and it is desired to wind the motor, the crank c'' is turned to the left through 90° until it comes into engagement with stop pin 330. During this movement of crank c'', owing to the fact that the motor spring or weight exerts much more force than spring 315, no relative movement of plate 309 and arm 305 will take place and notches 307 and 308 will remain in register and pawl 306 will therefore remain in these notches and turn disk 302 and shaft o'' through 90° and effect a complete revolution of the motor shaft o through gears 350 and 351. As soon as the winding pressure is removed from crank c'', it being understood that suitable locking means holds the motor in wound position, spring 315 at once acts to move plate 309 relatively to disk 302 until pin 314 engages arm 305, whereupon the inclined side of notch 308 will move pawl 306 from engagement with notch 307 of disk 302 and the latter notch will be covered by the peripheral portion of plate 309, all as shown in Fig. 14. Spring 311 will now act to return arm 305, crank c'', and plate 309 to their normal positions, and plate 302 will remain in the position to which it has been moved by the winding operation, until the motor is released, as shown in Fig. 15. Upon the release of the motor, the latter in its operation will return disk 302 to normal position and put spring 311 under its original tension and the parts will again be in the positions shown in Fig. 13, when notches 307 and 308 will register and pawl 306 will move into engagement therewith. It will be apparent that no matter how crank c'' is manipulated, it will be impossible to engage pawl 306 with notch 307, during the return movement of disk 302 under the action of the motor, as the notches will never be in register, and accordingly, the pawl will merely ride on the circular peripheral surfaces of the disk 302 and plate 309 until disk 302 has reached its normal position and the notches 307 and 308 are in register. This mechanism prevents tampering with the delivery device and interference with the transmission of the answer back signal during the operation of the motor to effect the delivery of a message.

The delivery device at each sub-station may be further protected, as by providing means for preventing the message paper of the register from being mutilated or written upon by anyone when no orders are being given. To accomplish this, I have provided a device comprising a protective cover, which preferably coöperates both with the signal and the telephone instrument at the respective sub-station, and which, when in protecting position, locks the winding handle or crank of the register and also covers the message paper in a manner that will exclude dust and dampness as much as possible. It is proposed to prevent this cover from being raised unless the signal is at a "stop" or calling position, or the telephone receiver is off its hook, or both. This arrangement may not stop all of the tampering with the register, but it will at least prevent a greater part of it. The essential features of this arrangement are shown in Fig. 16 wherein the casing, shown in section, is the casing of the autographic register located at any sub-station.

Reference character 213 represents the protective cover for the pad B' and the message paper which moves thereover. This cover is provided with a handle 212 and is secured by one or more arms 215, to shaft 216. The cover is provided with suitable means (not shown) for locking the winding crank of the register when the cover is in closed position. A sector gear 217 is secured to shaft 216 and meshes with a gear 217' which is loosely mounted on a shaft to which an escapement wheel 218 is secured. The gear 217' has a spring-pressed pawl 241 pivotally mounted thereon, which pawl coacts with a ratchet wheel 240 secured to the shaft on which gear 217' is mounted. (See Fig. 17). An escapement pawl 219 for the wheel 218 and a hammer 220 adapted to strike a gong or bell 221 on the standard 222, are fixed to a rotatably mounted shaft 223. The pawl 241 and ratchet 240 are so arranged that, when cover 213 is raised and sector 217 moves gear 217' in one direction, the escapement wheel 218 will be turned and thereby cause pawl 219 and hammer 220 to vibrate, and when the cover is lowered and sector 217 moves gear 217' in the opposite direction, pawl 241 will merely slip over the teeth on ratchet 240 and the escapement wheel 218 will not be turned. A pin or stud 238 is secured to shaft 223 and will vibrate with the hammer 220 and the pawl 219.

Reference character 237 represents a detent formed on an arm 236, which arm is movable about the axis of shaft 239 to move the detent into and out of the path of the pin 238. It will be apparent that when detent 237 is in engagement with pin 238 the cover will be locked in closed position. The telephone hook 225 for the telephone receiver 224, which is connected to the central station by a suitable circuit as hereinbefore described, is pivotally mounted on a shaft 226 and operatively connected to the arm 236 by a lever and link system 227, 231, 228, 229, 230, 232, 233, 234 and 235. When the receiver is on the hook 225 this system will hold the detent 237 on arm 236 in the path of pin 238 and thereby lock the cover 213, but when the receiver is taken off the hook 225, the spring 225' will actuate the lever and link system to move the detent 237 out of the path of the pin 238 and unlock the cover, at least as far as the telephone receiver is concerned. The signal rod $f$ is provided with an offset rod 203 which is connected at its upper end to the semaphore signal E E. Rod $f$ is also provided with a lug 205 in which a rod 206 slides, the rod 206 having a collar 207 therein adapted to engage lug 205. Rod 206 is pivotally connected at its lower end to an arm 208 which in turn is connected to an arm 210 mounted on shaft 209. When the semaphore is held in normal or "proceed" position by means coacting with rod $f$, such as hereinbefore described, the arm 210 will be held fixed in the position shown in Fig. 16 and prevent cover 213 from being raised. When the means which holds the rod $f$ is released from the central station, this rod and the offset rod 203 will drop and set the signal at "stop" position, as shown. This movement of rod $f$ moves the lug 205 away from collar 207 and thereby releases arm 210, and in consequence cover 213 and the latter may be raised, as far as the signal means is concerned. It will be apparent that if the cover is now opened, the restoring of the signal to a normal position will effect the closing of the cover and the locking of the same in closed position.

The cover 213 is provided with a spring catch 211 and the offset of shafts 209 and 216 and the position of arm 210 are such that when the cover is raised, the catch 211 will spring over the end of arm 210 and hold the cover in raised position. Either the signal or the telephone receiver locking device for the cover 213 may be employed alone, but I preferably employ both of these locking devices as the message paper of the register will thereby be more surely protected against mutilation.

The operation of the protective means for the autographic register is as follows: When a sub-station is called and the signal is set to call the train crew to the telephone, the cover 213 is unlocked, as far as the signal is concerned, but is still locked by reason of the telephone receiver being on its hook. As soon as the telephone receiver 224 is removed from its hook 225, the cover 213 is fully unlocked and on order from the central station, the cover is lifted so as to write the message on the paper in the register. The raising of the cover causes the vibration of hammer 220 as above described and rings the bell 221. The ringing of the bell is transmitted to the operator at the central station by means of the telephone transmitter and the line circuit and gives notice that the cover is being opened.

The various systems and apparatus which I have specifically described herein are merely illustrative, and it is to be understood that the same are subject to many changes and modifications without departing from the spirit of my invention and the scope of the appended claims.

Having now described my invention, what I claim as new and desire to protect by Letters Patent of the United States is as follows:—

1. A message delivery system comprising a plurality of separated stations, a message delivery device adapted for the reception of a manually inscribed message located at one of said stations, and means whereby the delivery of such a manually inscribed message from said device may be controlled from another of said stations.

2. A system of the character described comprising a plurality of separated stations, a message delivery device adapted for the reception of a manually inscribed message located at one of said stations, means for holding said device inoperative, and means controllable from another of said stations to release said holding means and thereby render said device operative to deliver such a manually inscribed message.

3. A system of the character described comprising a normally inoperative message delivery device adapted for the reception of a manually inscribed message, and means whereby said device may be controlled to render the same operative to deliver such a manually inscribed message at a point remote therefrom.

4. A system of the character described comprising a message delivery device provided with material on which a message as received from a point remote from said device is adapted to be manually inscribed, and means for controlling the delivery of such a manually inscribed message from said point.

5. A system of the character described comprising an autographic device having material on which a message is adapted to be manually inscribed as received from a remote point, and means for rendering said device operative from said remote point to deliver a predetermined length of said material therefrom.

6. A system of the character described comprising an autographic manifolding device, and means to control the same from a distant point to render the same operative to deliver a predetermined length of material on which a message may have been written, said device being provided with means for retaining a copy of any such message.

7. A system of the character described comprising a message delivery device adapted for the reception of a manually inscribed message, means comprising a member provided with an armature adapted to coöperate with said device to hold the same inoperative, and means for controlling the operation of said member from a remote point to render said device operative to deliver such a manually inscribed message comprising an electric circuit including an electromagnet for said armature.

8. A system of the character described comprising a message delivery device adapted for the reception of a manually inscribed message, means comprising a member provided with an armature adapted to coöperate with said device to hold the same inoperative, said member being biased to operative position, and means for controlling the operation of said member from a remote point to render said device operative to deliver such a manually inscribed message, comprising an electric circuit including an electromagnet for said armature.

9. A system of the character described comprising a pair of stations, an electric circuit connecting said stations and over which messages are adapted to be transmitted, a message delivery device at one of said stations having material on which a message so transmitted is adapted to be manually inscribed, and means including a portion of said circuit for controlling said device to render the same operative to deliver a message so inscribed from the other of said stations.

10. A system of the character described comprising a pair of stations, a message delivery device located at one of said stations and provided with material on which a message is adapted to be manually inscribed, means controllable from the other of said stations to render said device operative to deliver such material, and means for indicating at the latter station that said device has been rendered operative.

11. A system of the character described comprising a pair of stations connected by an electric circuit, a message delivery device located at one of said stations and provided with material on which a message is adapted to be manually inscribed, and means whereby the operation of said device to deliver such material may be controlled over said circuit from the other of said stations.

12. A system of the character described comprising a message delivery device provided with a manifold on which a message as received from a distant point is adapted to be inscribed, and means whereby said device may be rendered operative from said distant point, said device when operative being adapted to deliver one or more copies of a message so inscribed and being provided with means for retaining another copy of such a message.

13. A message delivery system comprising a message delivery device adapted to hold a manually inscribed message, and means controllable at a point remote from said device to render the latter operative to deliver such manually inscribed message.

14. A message delivery system comprising a message delivery device provided with material on which a message as received from a distant point is adapted to be manually inscribed, and electrical means controllable at such point to render said device operative to deliver any such manually inscribed message.

15. A message delivery system comprising a central station and a sub-station united by a line circuit, a message delivery device at said sub-station, said circuit being adapted to serve as a means of communication between said stations, said device being provided with material whereon a message received over said line from the central station is adapted to be manually inscribed, and means operable over said circuit and controllable at said central station to render said device operative to deliver a message so inscribed.

16. A system of the character described comprising a pair of stations, a message delivery device located at one of said stations and provided with material on which a message is adapted to be manually inscribed, means controllable from the other of said stations to render said device operative to deliver said material, and means for transmitting an indication to the latter station from the station at which the delivery device is located of the operation of the latter in delivering such material therefrom.

17. A system of the character described comprising a station adapted to hold a manually inscribed message, a message delivery device at said station, means controllable from a distant point to render said device operative to deliver such a manually inscribed message, and means adapted to transmit a signal to said point characteristic of said station and indicative of the operation of said device.

18. A system of the character described comprising a central station, a plurality of sub-stations each having a message delivery device provided with material on which a message is adapted to be manually inscribed, means controllable from the central station to render any one of said devices operative to deliver said material therefrom, and means adapted to transmit a signal characteristic of the sub-station at which such device is located and indicative of the operation of said device in delivering said material, to said central station.

19. A system of the character described comprising a central station, a plurality of sub-stations each having a message delivery device, means controllable from the central station to render any of said devices operative to deliver messages, means for indicating at said central station the fact that any of said devices has been rendered operative, and means distinct from said last mentioned means and adapted to thereafter transmit a signal characteristic of the sub-station at which such device is located and indicative of the operation of said device, to said central station.

20. A system of the character described comprising a message delivery apparatus provided with material on which a message is adapted to be manually inscribed, a device for holding said apparatus inoperative, means controllable from a distant point for effecting the release of said holding device to render said apparatus operative to deliver such material, and means adapted upon the operation of said apparatus to render said releasing means inoperative.

21. A system of the character described comprising a message delivery apparatus provided with material on which a message is adapted to be manually inscribed, a device for holding said apparatus inoperative, means controllable from a distant point for effecting the release of said holding device to render said apparatus operative to deliver such material, and means controlled by said apparatus and adapted upon the actuation of the latter to render said releasing means inoperative.

22. A system of the character described comprising a pair of stations connected by an electric circuit, a message delivery device at one of said stations, means for holding said device inoperative, means comprising a magnet in said circuit and adapted when the circuit is closed to actuate said holding means to thereby release said device and render the same operative to deliver a message, and means for breaking said circuit upon the actuation of said device to thereby deënergize said magnet and render said holding means operative.

23. A system of the character described comprising a pair of stations connected by an electric circuit, a message delivery device at one of said stations, means for holding said device inoperative, means comprising a magnet in said circuit and adapted when the circuit is closed to actuate said holding means to thereby release said device and render the same operative to deliver a message, and means operable by said device upon the actuation of the latter to break said circuit and thereby deënergize said magnet and render said holding means operative.

24. A system of the character described comprising a plurality of stations, a message delivery device located at each of said stations and provided with material on which a message is adapted to be manually inscribed, and means whereby said message delivery devices may be selectively controlled from a given point to render any desired delivery device operative to deliver said material therefrom.

25. A system of the character described comprising a plurality of stations, a message delivery device located at each of said stations and provided with material on which a message is adapted to be manually inscribed, means whereby said message delivery devices may be selectively controlled from a given point to render any desired delivery device operative to deliver said material therefrom, and means for indicating at said point the station of the device selected.

26. A system of the character described comprising a central station, a plurality of sub-stations, a message delivery device located at each of said sub-stations and provided with material on which a message as received from the central station is adapted to be manually inscribed, and means entirely under the control of an operator at said central station for rendering any desired one of said devices operative to deliver said material therefrom.

27. A system of the character described comprising a message delivery device provided with material on which a message is adapted to be manually inscribed, and means entirely under the control of an operator at a distant point for rendering said device operative to deliver said material therefrom.

28. A system of the character described comprising a message delivery device adapted for the reception of a manually inscribed message, means for holding said device inoperative, and means entirely under the control of an operator at a distant point for rendering said holding means inoperative.

29. A system of the character described comprising a central station, a plurality of sub-stations, a message delivery device located at each of said sub-stations and provided with material on which a message is adapted to be manually inscribed, means under the control of an operator at said central station for rendering any desired one of said devices operative to deliver said material therefrom, and means for transmitting an indication to the central station characteristic of the sub-station of the message delivery device rendered operative.

30. In combination, a message delivery device adapted for the reception of a manually inscribed message, means for holding said device inoperative, and means under the control of an operator at a distant point for releasing said holding means to thereby render said device operable to deliver such a message.

31. In combination, a message delivery apparatus adapted for the reception of a manually inscribed message, a device biased to operative position for holding said apparatus inoperative, a magnet adapted when energized to move said device to release said apparatus and thereby render the same operable to deliver such a message, and means under the control of an operator at a distant point for energizing said magnet.

32. In combination, a message delivery device comprising an autographic register and means for operating the same, means for holding said device inoperative in opposition to said operating means, and means to release said holding means from a distant point.

33. A message delivery system comprising a central station, a plurality of sub-stations, a message delivery device located at each of said sub-stations and provided with material on which a message is adapted to be manually inscribed, means for selecting any one of said sub-stations from said central station, and means under the control of an operator at the central station, when one of said sub-stations has been selected, for rendering the delivery device at such sub-station operative to deliver said material therefrom.

34. In a message delivery system, a central station and a plurality of sub-stations connected by a line circuit, means for selectively connecting said sub-stations in said line circuit from the central station, a message delivery device at each of said sub-stations, and means operable from the central station over said line only when one of said sub-stations has been so connected, for rendering the message delivery device at such sub-station operative.

35. In a system of the character described, a pair of stations connected by a two-wire electric circuit, a message delivery device located at one of said stations and adapted to hold a manually inscribed message, and means comprising multiple connections to said circuit at said stations whereby different paths for electric current may be selectively established between said stations and over said two-wire circuit and said connections, said device being controlled to effect the delivery of such manually inscribed message by the current flowing over said circuit and through one of said connections but not being affected by the current flowing over said circuit and through another of said connections.

36. In a system of the character described, a central station and a plurality of sub-stations connected by a line circuit, a message delivery device at each of said sub-stations, an electrical device adapted to coöperate with each of said devices to render the same operative to deliver a message, means under the control of an operator at the central station for selectively connecting said electrical devices in said line circuit, and means under the control of the operator at the central station for energizing any of said electrical devices, when the same has been connected in the line, to thereby render the respective delivery device operative to deliver a message.

37. In a system of the character described, a central station and sub-stations united by a line circuit, a selector at each sub-station, a message delivery device located at each sub-station and provided with material on which a message is adapted to be manually inscribed, means controlled at said central station and operable over said circuit to operate said selectors to select any desired sub-station, and means controlled at said central station and operable over said circuit to render the delivery device at a sub-station which has been so selected operative to deliver said material.

38. In a system of the character described, a message delivery device adapted to retain a manually inscribed message, means controllable from a distant point for rendering said device operative to deliver such a manually inscribed message, and means for transmitting a signal from said device to said point to indicate the operation of such device and also to transmit a signal to said point characteristic of the location of said device.

39. In a system of the character described, a central station and sub-stations united by a line circuit, a message delivery device located at each of said sub-stations and provided with material on which a message is adapted to be manually inscribed, means controlled at said central station and operable over said circuit to render any of said devices operative to deliver said material, and means operable over said circuit to give a signal at the central station characteristic of the sub-station of a message delivery device which has been rendered operative.

40. In a system of the character described, a message delivery device adapted to retain a manually inscribed message, means controlled from a distant point for rendering said device operative to deliver such a manually inscribed message, and means controlled by said device to transmit an indication to said point of the operation of such device.

41. In a system of the character described, a message delivery device provided with material on which a message is adapted to be manually inscribed, means controlled from a distant point for rendering said device operative to deliver said material, and means controlled by said device to transmit an indication to said point of the operation of such device and also to transmit a signal to said point characteristic of the location of said device.

42. In a system of the character described, a motor operated message delivery device provided with material on which a message is adapted to be manually inscribed, means for holding said device inoperative in opposition to the motor therefor, and means controlled at a distant point for releasing said holding means to thereby render said device operative to deliver said material.

43. In a system of the character described, a motor operated message delivery device provided with material on which a message is adapted to be manually inscribed, means for holding said device inoperative in opposition to the motor therefor, means controlled at a distant point for releasing said holding means and thereby render said device operative to deliver said material, and means actuated by such motor upon its operation for rendering the releasing means inoperative.

44. In a system of the character described, a motor operated message delivery device provided with material on which a message is adapted to be manually inscribed, means for holding said device inoperative in opposition to the motor therefor, means controlled at a distant point for releasing said holding means and thereby render said device operative to deliver said material, and means actuated by such motor upon its operation for rendering the releasing means inoperative, said holding means being adapted to again render said device inoperative after a predetermined operation of the latter.

45. In a system of the character described, a message delivery device provided with material on which a message is adapted to be manually inscribed, a motor for operating the same, manual means for winding the motor, means for holding the device inoperative against the action of said motor, and means controlled from a distance to release said holding means to thereby permit said motor to actuate said device to deliver said material.

46. In a system of the class described, a message delivery device provided with material on which a message is adapted to be manually inscribed, a motor for actuating said device to deliver said material, means controllable from a distant point to render said motor operative, and means for transmitting to said point an indication of the operation of said motor.

47. In a system of the character described, a central station, a sub-station, a message delivery device and a signal at said sub-station, means controlled at the central station for effecting the operation of the signal, means controlled at the central station for rendering said device operative to deliver a message, and means whereby said means for rendering said device operative, is rendered operable only when said signal is in a given position.

48. In a system of the character described, a station, a message delivery device at said station provided with material on which a message is adapted to be manually inscribed and means for effecting the delivery of such material, signaling means located at said station, and means for controlling the signaling means from a distant point to attract attention to said station.

49. In a system of the character described, a station, a message delivery device at said station controllable from a distant point provided with material on which a message is adapted to be manually inscribed and means for effecting the delivery of such material, signaling means located at said station, and means for controlling the signaling means from said point to attract attention to said station.

50. In a system of the character described, a message delivery device, means controllable from a distant point for rendering said device operative to deliver a message, and a signal adjacent said device, said means being inoperative when said signal is in one position and being rendered operative when the signal is moved to another position.

51. In a system of the character described, a station, a message delivery device at said station, means comprising an electric circuit and controllable from a distant point for rendering said device operative to deliver a message, a signal at said station, and means controlled by said signal whereby when the signal is at a "proceed" position said circuit is open at said station and when the signal is at a "stop" position the circuit is closed at said station.

52. In a system of the character described, a central station and a plurality of sub-stations, a message delivery device and a signal at each of said sub-stations, each of said devices being provided with material on which a message is adapted to be manually inscribed and means for effecting the delivery of such material, and means for selectively controlling the operation of said signals from the central station to attract attention to any desired station.

53. In a system of the character described, a central station and a plurality of sub-stations, a message delivery device and a signal at each of said sub-stations, means for selectively controlling the operation of said signals from the central station, and means controllable at the central station and operable only when any of said signals is at a certain position, to render the corresponding message delivery device operative.

54. In a system of the character described, a central station, a sub-station, a signal and a message delivery device at said sub-station, said device being provided with material on which a message is adapted to be manually inscribed and means to effect the delivery of such material therefrom, means controllable from the central station to effect the operation of the signal, and means to transmit to the central station an answer back indicative of the operation of the signal.

55. In a system of the character described, a central station, a sub-station, a signal and a message delivery device at said sub-station, means controllable from the central station to effect the operation of the signal, means to transmit to the central station an answer back indicative of the operation of the signal, and means at the central station for recording said answer back.

56. In a system of the character described, a central station, a sub-station, a signal and a message delivery device at said sub-station, means controllable from the central station to effect the operation of the signal, means to transmit to the central station an answer back indicative of the operation of the signal, and means at the central station for recording and timing said answer back.

57. In a system of the character described, a central station, a plurality of sub-stations, a signal and a message delivery device at each of said sub-stations, means controllable from the central station for selectively effecting the operation of said signals, and means to transmit to the central station an answer back characteristic of the sub-station at which any of the signals has operated.

58. In a system of the character described, a central station, a plurality of sub-stations, a signal and a message delivery device at each of said sub-stations, means controllable from the central station for selectively effecting the operation of said signals, means to transmit to the central station an answer back characteristic of the sub-station at which any of the signals has operated, and means at the central station for recording such answer back.

59. In a system of the character described, a central station and a sub-station united by a line circuit, a signal and a message delivery device at said sub-station, means controllable from the central station and operable over said circuit for effecting the operation of the signal, said means comprising an electromagnet, and means at said sub-station for controlling the operation of the message delivery device, the operation of said signal removing said electromagnet from the line circuit and connecting said controlling means in said line circuit.

60. In a system of the character described, a central station and a sub-station united by a line circuit, a signal and a message delivery device at said sub-station, means controllable from the central station and operable over said circuit for effecting the operation of the signal, said means comprising an electromagnet, means at said sub-station for controlling the operation of the message delivery device, the operation of said signal removing said electromagnet from the line circuit and connecting said controlling means in said line circuit, and means adapted upon the operation of the message delivery device to remove said controlling means from said line circuit.

61. In a system of the character described, a central station and a sub-station united by a line circuit, a signal and a message delivery device at said sub-station, means controllable at said central station and operable over said line circuit for effecting the operation of said signal and said device, means for transmitting to said central station upon the operation of the signal an answer back characteristic of the sub-station, and means for transmitting to said central station an indication of the operation of the message delivery device and characteristic of the sub-station and of the message delivery device.

62. In a system of the character described, a central station and a sub-station united by a line circuit, a signal and a message delivery device at said sub-station, means controllable at said central station and operable over said line circuit for effecting the operation of said signal and said device, and means for transmitting to said central station an indication of the operation of the message delivery device and characteristic of the sub-station and of the message delivery device.

63. In a system of the character described, a central station and a plurality of sub-stations united by a line circuit, a signal and a message delivery device at each of said sub-stations, means controllable at said central station and operable over said line circuit for selectively effecting the operation of said signals and said devices, means for transmitting to said central station upon the operation of any of the signals an answer back characteristic of the sub-station at which such signal is located, and means for transmitting to said central station an indication of the operation of any of the message delivery devices and characteristic of the sub-station at which such device is located and of the message delivery devices.

64. In a system of the character described, a central station and a plurality of sub-stations united by a line circuit, a signal and a message delivery device at each of said sub-stations, means controllable at said central station and operable over said line circuit for selectively effecting the operation of said signals and said devices, and means for transmitting to said central station an indication of the operation of any of the message delivery devices and characteristic of the sub-station at which such device is located and of the message delivery devices.

65. In a system of the character described, a central station, a sub-station, a message delivery device at said sub-station provided with material on which a message is adapted to be manually inscribed, means controllable at said central station for rendering said device operative to deliver said material, means for transmitting an answer back to said central station of the operation of said device, and means at the central station for recording such answer back.

66. In a system of the character described, a central station, a sub-station, a message delivery device at said sub-station, means controllable at said central station for rendering said device operative to deliver a message, means for transmitting an answer back to said central station of the operation of said device, and means at the central station for recording and timing such answer back.

67. In a system of the character described, a central station, a plurality of sub-stations, a message delivery device at each of said sub-stations provided with material on which a message is adapted to be manually inscribed, selecting means controllable at said central station for rendering the delivery device at any desired sub-station operative to deliver said material, means adapted to transmit to said central station an answer back of the operation of any such device and characteristic of the corresponding sub-station, and means at the central station for recording such answer back.

68. In a system of the character described, a central station, a plurality of sub-stations, a message delivery device at each of said sub-stations, selecting means controllable at said central station for rendering the delivery device at any desired sub-station operative to deliver a message, means adapted to transmit to said central station an answer back of the operation of any such device and characteristic of the corresponding sub-station, and means at the central station for recording and timing such answer back.

69. In a system of the character described, a message delivery device provided with material on which a message is adapted to be manually inscribed and an operating motor to actuate said device to deliver such material, electrical means to control the operation of the motor from a distant point, and means to limit the run of said motor.

70. In a system of the character described, a message delivery device provided with materal on which a message is adapted to be manually inscribed and an operating motor to actuate said device to deliver such material, electrical means to control the operation of the motor from a distant point, and means to limit the run and control the speed of said motor.

71. In a system of the character described, a central station, a plurality of sub-stations, a message delivery device comprising an autographic register and an operating motor therefor at each of said sub-stations, selective means to effect the operation of said motors from said central stations, and means to limit the run of each of said motors.

72. In a message delivery apparatus, message delivering means, a motor for operating said means, a device for holding said means inoperative in opposition to the action of said motor comprising a member provided with an armature, means for releasing said holding device comprising a magnet for said armature, said member being biased to a position to form an air gap between said armature and magnet sufficiently great to prevent actuation of the armature by the magnet if the latter is energized, and means adapted upon the winding of the motor to move said armature to reduce said air gap without releasing the message delivery means from the control of said holding device.

73. In a message delivery apparatus, message delivering means, a motor for operating said means, a device for holding said means inoperative in opposition to the action of said motor comprising a member provided with an armature, means for releasing said holding device comprising an electric circuit and a magnet for said armature, said magnet being normally cut out of said circuit, said member being biased to a position to form an air gap between said armature and magnet sufficiently great to prevent actuation of the armature by the magnet if the latter is energized, and means adapted upon the winding of the motor to connect said magnet in said circuit and to move said armature to reduce said air gap without releasing the message delivery means from the control of said holding device.

74. In a message delivery apparatus, message delivery means, a motor for operating said means, a device for holding said means inoperative against the action of said motor, means for releasing said holding means to allow said motor to operate the delivery means, said device being biased to operative position and into inoperative relation with respect to said releasing means, and means adapted upon the winding of the motor to bring said holding device into operative relation with respect to said releasing means but without rendering the same inoperative.

75. A message delivery apparatus comprising an autographic registering device provided with material upon which a message is adapted to be inscribed, means for delivering such an inscribed message from the apparatus, and a removably mounted member adapted when operated to effect the presentation of a characteristic indication, said member being replaceable by a similar member adapted to effect the presentation of a different characteristic indication whereby the apparatus is rendered adaptable for use at any one of a plurality of locations or stations in a system.

76. In a message delivery apparatus, means for delivering a message, a motor for actuating said delivering means, means for winding said motor, and means adapted during the operation of said motor to prevent said winding means from interfering with the operation of the delivering means.

77. In a system of the character described, a central station, a sub-station, a message delivery device at said sub-station, means controlled at said central station to render said device operative to deliver a message, means for transmitting an answer back to the central station indicative of the delivery of the message, and means for preventing interference with the transmission of the answer back.

78. In a motor operated messsage delivery device, a winding mechanism for the motor, and means adapted upon relieving said mechanism from the winding pressure to automatically disconnect such mechanism from the motor and to prevent further operative connection thereof with the motor until the latter has completed its actuation of the delivery device.

79. A message delivery device, a motor for actuating the same, a winding shaft for the motor, a member fast to said shaft, a crank loosely mounted on said shaft and carrying a pawl adapted to operatively engage said member to turn the same and thereby wind the motor when the crank is turned in one direction, a member adapted to act on said pawl to disengage the same from the member fast to the shaft, and means for rendering said disengaging member operative when the crank is relieved from the winding pressure.

80. A message delivery device, a motor for operating the same, a winding shaft for the motor, a disk fast on said shaft and having a notch in the periphery thereof, a crank loose on said shaft and having a pawl pivoted thereto and adapted to engage the notch in said disk to turn the shaft and thereby wind the motor when the crank is turned in one direction, a strong spring under tension connecting said disk and crank and tending to turn the crank in the opposite direction, a member loose on said shaft disposed between said disk and crank and provided with a pair of stops to limit the movement of the crank with respect thereto, a light spring connecting said crank and member, said member being provided with a peripheral surface coinciding with the peripheral surface of said disk and a notch adapted in one relative position of said disk and member to register with the notch in said disk and permit the pawl to engage the latter notch, and means for limiting the movement of said crank and member under the action of the spring connecting said disk and the crank.

81. In a system of the character described, a central station, a sub-station, a message delivery device at said sub-station, said device being provided with material on which a message as received from the central station is adapted to be inscribed, a protective cover for said material, and means for locking said cover in protecting position, said locking means being controllable from the central office to release said cover.

82. In a system of the character described, a signal, means for controlling the operation of said signal from a distant point, a message delivery device, a protective cover therefor, and means controlled by said signal to lock said cover in protecting position when the signal is in one position and to unlock the cover when the signal is in another position.

83. In a system of the character described, a signal, means for controlling the operation of said signal from a distant point, a message delivery device, a protective cover therefor, means controlled by said signal to lock said cover in protecting position when the signal is in one position and to unlock the cover when the signal is in another position, and means coacting with said locking means when the cover is opened to lock the cover in open position.

84. In a system of the character described, a message delivery device, a protective cover therefor, means controllable from a distant point to render said device operative to deliver a message, and means whereby a signal will be transmitted to said point when said cover is opened.

85. In a system of the character described, a central station, a sub-station, a message delivery device at said sub-station, a signal at said sub-station normally in "proceed" position, means controllable from the central station to effect the movement of said signal to "stop" position, and means controllable by said signal for locking said cover in closed position when the signal is in "proceed" position and for unlocking said cover when the signal is in "stop" position.

86. In a system of the character described, a central station, a sub-station, a message delivery device at the sub-station provided with material presenting a recording surface, a protective cover for said recording surface, a telephone instrument at the sub-station connected by a telephone circuit with the central station, and means for locking said cover in closed position when said telephone instrument is in inoperative position and for unlocking the cover when the telephone instrument is moved from such position.

87. In a system of the character described, a central station, a sub-station, a message delivery device at the sub-station provided with material presenting a recording surface, a protective cover for said recording surface, a telephone instrument at the sub-station connected by a telephone circuit with the central station, means for locking said cover in closed position when said telephone instrument is in inoperative position and for unlocking the cover when the telephone instrument is moved from such position, and means for sounding a signal when said cover is opened which is transmitted by said telephone instrument and circuit to the central station.

88. In a system of the character described, a central station, a sub-station, a signal and a message delivery device provided with a recording surface at said sub-station, a telephone instrument at said sub-station, means controllable from the central station to effect the movement of the signal to "stop" position, and means for locking said cover in closed position either when the telephone instrument is in inoperative position or the signal is in "proceed" position and for unlocking said cover when the telephone instrument is moved from inoperative position and the signal is moved to "stop" position.

89. In a system of the character described, a central station and a sub-station united by a line circuit, a message delivery device at said sub-station, a motor for actuating said device, means for holding said motor inoperative, means controllable from said central station and operable over said circuit for releasing said holding means, said releasing means being normally out of said circuit, and means operated by the winding of the motor to connect said releasing means in said circuit.

90. A message delivery device provided with material on which messages may be recorded and a cover for protecting said material, a motor for actuating said device, and winding means for said motor, said cover when in closed position preventing the operation of said winding means.

91. In a system of the character described, a central station, a sub-station, a signal at said sub-station, means for controlling said signal from the central station, a motor-operated message delivery device at said sub-station, said device being provided with material on which messages may be recorded and a protective cover for said material, winding means for the motor of said device, said cover when in closed position preventing the actuation of said winding means, and means for locking said cover in closed position when said signal is in "proceed" position and for unlocking the cover when the signal is moved to "stop" position.

92. In a system of the character described, a motor-operated message delivery device provided with material on which messages may be recorded and a protective cover for said material, means for winding the motor of said device, said cover when in closed position preventing the operation of said winding means, a telephone instrument adjacent said device, and means for locking said cover in closed position when said telephone instrument is in inoperative position and for unlocking said cover when said telephone instrument is moved from said position.

93. In a system of the character described, a message delivery apparatus provided with material on which a message is adapted to be manually inscribed, electrical controlling means located at a point remote from said apparatus, and means whereby said apparatus is rendered operative to deliver said material in response to some electrical impulses transmitted thereto by said controlling means but not by others.

94. In a system of the character described, a message delivery apparatus provided with material on which a message is adapted to be manually inscribed, electrical means for controlling the delivery of such a message from said apparatus from a point remote therefrom, and means whereby the delivery of such message from said apparatus is automatically recorded at said point.

95. In a system of the character described, a central station, a sub-station, a message delivery apparatus at the sub-station provided with material on which a message is adapted to be manually inscribed as received from the central station, and electrical controlling means whereby said apparatus may be rendered operative from the central station to deliver such a message but only in response to predetermined electrical impulses transmitted to the sub-station from the central station.

96. In a system of the character described, a central station, a sub-station, a message delivery apparatus at the sub-station provided with material on which a message as received from the central station is adapted to be manually inscribed, electrical controlling means whereby said apparatus may be rendered operative from the central station to deliver such a message but only in response to predetermined electrical impulses transmitted to the sub-station from the central station, and means for transmitting to the central station an indication characteristic of the delivery of such message.

97. In a system of the character described, a central station and a plurality of sub-stations connected by a line circuit over which messages are adapted to be transmitted to the sub-stations from the central station, a message delivery device at each of said sub-stations provided with material on which a message is adapted to be manually inscribed as transmitted from the central station over the line circuit, and means whereby each of said message delivery devices may be rendered operative to deliver such a message only in response to predetermined electrical impulses transmitted thereto from the central station and different in the case of each message delivery device.

98. In a system of the character described, a central station and a plurality of sub-stations connected by a line circuit over which messages are adapted to be transmitted to the sub-stations from the central station, a message delivery device at each of said sub-stations provided with material on which a message is adapted to be manually inscribed as transmitted from the central station over the line circuit, means whereby each of said message delivery devices may be rendered operative to deliver such a message only in response to predetermined electrical impulses transmitted thereto from the central station and different in the case of each message delivery device, and means for transmitting to the central station upon the delivery of any such message an indication characteristic of the sub-station at which such message is delivered.

99. A system of the character described comprising a pair of stations, a message delivery device at one of said stations, means for holding said device inoperative, means comprising an electric circuit and adapted when the circuit is closed to cause said holding means to release said device and render the same operative to deliver a message, and means for breaking said circuit upon the operation of said device in delivering the message to thereby render said holding means operative.

100. A system of the character described comprising a pair of stations, a message delivery device at one of said stations, means for holding said device inoperative, means comprising an electric circuit and adapted when the circuit is closed to cause said holding means to release said device and render the same operative to deliver a message, and means for breaking said circuit upon the operation of said device in delivering the message to thereby render said holding means operative.

101. A system of the character described, comprising a pair of stations, a message delivery device at one of said stations, means for holding said device inoperative, means comprising an electric circuit and adapted when the circuit is closed to cause said holding means to release said device and render the same operative to deliver a message, and means operable by said device upon the operation thereof in delivering a message to break said circuit and thereby render said holding means operative.

102. In a system of the character described, a central station and a sub-station connected by a line circuit, a message delivery device at the sub-station, means comprising an electrical device associated with the message delivery device and controllable from said central station over said circuit to render the delivery device operative to deliver a message, said means being operable only when said electrical device is connected in said circuit, and means tending to maintain said electrical device out of said circuit.

103. In a system of the character described, a central station and a sub-station connected by a line circuit, a message delivery apparatus at the sub-station, electrical controlling means for said apparatus normally out of said circuit, manually operable means for connecting said controlling means in said circuit, and means controlled at said central station and operable over said circuit to render the delivery apparatus operative to deliver a message, said last-named means being operable only when said electrical controlling means is connected in said circuit.

104. In a system of the character described, a central station and a sub-station connected by a line circuit, a motor-operated message delivery apparatus at the sub-station, means for holding said apparatus inoperative in opposition to its motor, electrical controlling means operable from the central station over said circuit to cause said holding means to release said apparatus, said electrical controlling means being normally out of said circuit, and means for connecting said electrical controlling means in said circuit when energy is stored in said motor.

105. In a system of the character described, a central station and a sub-station connected by a line circuit, a motor-operated message delivery apparatus at the sub-station, manually operable means for winding the motor of said apparatus, means for holding said apparatus inoperative in opposition to its motor, electrical controlling means operable from the central station over said circuit to cause said holding means to release said apparatus, said electrical controlling means being normally disconnected from said circuit, and means whereby upon the winding of said motor said electrical controlling means is connected in said circuit.

106. In a system of the character described, a message delivery device, a signal associated therewith, means for rendering said device operative to deliver a message, said means being operable only when said signal is in a predetermined position.

In testimony whereof I have affixed my signature, in the presence of two witnesses.

ORLANDO W. HART.

Witnesses:
LEONARD WILKINSON,
THOMAS F. BRADY.